Jan. 18, 1938. A. H. MOSHER Re. 20,627
BATTERY FILLING DEVICE
Original Filed Aug. 7, 1931
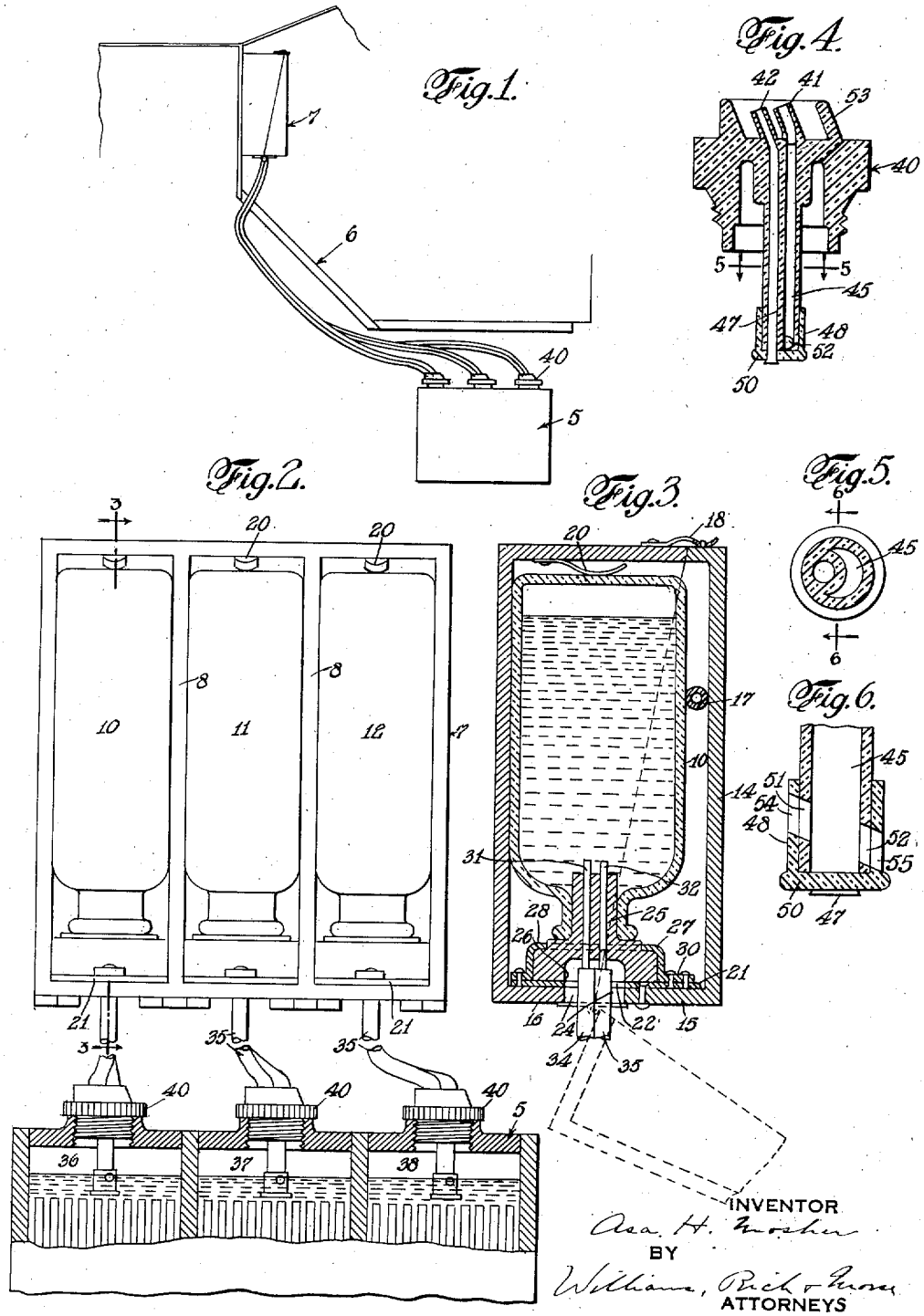
INVENTOR
Asa H. Mosher
BY
Williams, Rich & Green
ATTORNEYS Reissued Jan. 18, 1938

Re. 20,627

UNITED STATES PATENT OFFICE 20,627

BATTERY FILLING DEVICE

Asa H. Mosher, Westfield, N. J.

Original No. 2,022,380, dated November 26, 1935, Serial No. 555,729, August 7, 1931. Application for reissue November 22, 1937, Serial No. 175,990

8 Claims. (Cl. 137—68)

This invention relates to battery filling devices for delivering water to storage batteries in such quantities, whenever required, as will maintain the electrolyte between maximum and minimum levels within the battery.

An important object of the invention is to provide a device of the character mentioned which is simple in construction, cheap to manufacture and reliable in operation.

Other objects and advantages of the invention will become apparent from the following description taken in connection with the accompanying drawing, in which—

Fig. 1 is a fragmental view showing the device installed in an automobile and connected to the storage battery thereof;

Fig. 2 is an enlarged view showing, partly in elevation and partly in section, the storage battery, and also showing a reservoir cabinet in which the reservoirs, individual to the battery cells, are supported, the closure for the cabinet removed;

Fig. 3 is a vertical sectional view taken on line 3—3 of Fig. 2, the closure for the cabinet being shown in full lines in its closed position and in broken lines in its open position;

Fig. 4 is an enlarged central vertical sectional view of a battery cap provided with an air conduit and a liquid conduit;

Fig. 5 is a horizontal sectional view taken on line 5—5 of Fig. 4, and

Fig. 6 is a vertical sectional view taken on line 6—6 of Fig. 5.

Although the device embodying this invention may be employed in connection with storage batteries, regardless of the specific function that such batteries are to perform, it is herein shown and described in connection with a battery 5 serving as part of the equipment of an automobile, indicated fragmentally by the numeral 6 in Fig. 1.

The device embodying the invention comprises a reservoir cabinet 7 which may be conveniently mounted on the automobile remote from the battery as, for example, beneath the cowl, as shown. This cabinet is divided by partitions 8 into a plurality of compartments, which correspond in number to the number of cells in the battery. These compartments are adapted to snugly receive a plurality of reservoirs 10, 11 and 12 which are preferably square in horizontal section and are held against displacement by a closure 14, the lower wall 15 of which is hinged to the lower wall 16 of the cabinet in such manner that it is permitted, when open, to swing downwardly to an inverted position as shown in dotted lines in Fig. 3. Preferably the closure 14 is provided on its inner wall with a transverse cushioning rod or bar 17 which, when the closure is locked in its closed position by a suitable snap fastener as shown at 18, engages the forward faces of the reservoirs 10, 11 and 12, whereby they are held firmly against the rear wall of the cabinet in such manner as to engage the upper end of the reservoirs, when they are positioned as shown in Fig. 2, whereby a downward thrust is normally exerted on the same.

To the bottom wall 15 of the closure are connected a plurality of anchor plates 21, one for each compartment of the cabinet 7. Each of these anchor plates is provided centrally with an opening 22 which, when the cabinet is closed, registers with an opening formed intermediate the bottom wall 15 of the closure and the bottom wall 16 of the cabinet by notches 24 which are provided in the meeting margins of these walls. On each anchor plate 21 is mounted a stopper 25, the base portion of which is formed with a recess 26, which registers with the opening 22 in the anchor plate. Each stopper 25 is held in a fixed relation on the anchor plate 21 by a suitable collar 27, which encircles the upper end of the stopper and rests on an annular ledge 28 provided thereon, the collar 27 being provided with a pair of depending angular arms 30 which are suitably connected to the anchor plate.

From the above described stopper-mounting means, it will be understood that the stoppers are carried wholly by and are movable with the closure 14, although such stoppers are in part supported by the lower wall 16 of the cabinet when the closure is in its closed position. It will be further understood that due to the relation of the stoppers to the closure, the reservoirs may be placed in position, without danger of spilling their contents, by first forcing the neck of the respective reservoirs up on the stoppers while the closure is in its inverted position, and by later moving the closure 14, together with the stoppers and their associated reservoirs to closed position, thus bringing the reservoirs into their vertical positions, as shown in Fig. 2, beneath the springs 20.

Projecting through each stopper, are a pair of connector tubes 31 and 32. These tubes communicate with the respective reservoirs and project from the stoppers into the recesses 26 thereof, the projecting ends of such tubes being adapted to receive thereon a pair of long, small diameter, flexible tubes or pipes 34 and 35 adapted to have bends along their lengths to permit of their convenient installation in an automobile as shown in Fig. 1, and which lead from the respective reservoirs 10, 11 and 12 to the respective cells 36, 37 and 38 of the battery.

With each cell is associated a battery cap 40, which is provided with tubular extensions 41 and 42, the extension 41 being connected to the flexible tube or pipe 34 and arranged to communicate with an air tube or quick dumping chamber 45 of relatively large diameter, which is connected to the cap and projects therefrom into the battery cell. The extension 42 is connected to the flexible tube or pipe 35 and is arranged to communicate with a small diameter liquid tube 47 located within the air tube 45, a part of the wall of the liquid tube being common to a part of the wall of the air tube, as shown in Fig. 5, so that each of these tubes reinforces the other, as will be readily understood. To the lower end of the air tube 45, is connected a cap 48, through the end or baffle wall 50 of which the liquid tube 47 passes. The lower end of the air tube or dumping chamber 45 is provided with a relatively large vent or air intake opening 51 and with a liquid discharge opening 52, both of which register with similar openings 54 and 55 formed in the wall of the cap 48, and the latter of which is located at a point lower than the vent or air intake opening 51 for the purpose which will hereinafter more clearly appear. By reason of the presence of the baffle wall 50, of the cap 48 which closes the lower end of the air tube or dumping chamber 45, gas bubbles, such as occur during battery charging, are prevented from entering the respective reservoirs by way of the relatively large air tube or dumping chamber 45, it being noted that the openings 51 and 52 are disposed substantially out of the path of travel of any rising gas bubbles, and hence do not permit gases to enter the air tube or quick dumping chamber under battery charging conditions. As to the liquid tube 47, it will be noted that, due to its relatively small diameter, such gas as may approach the lower end thereof during battery charging is prevented from entering the same, with the result that such bubbles, in seeking the path of least resistance, will be deflected away from the lower end of such tube and will move upwardly about the air tube or dumping chamber 45 in rising to the level of the liquid within the cell.

From the foregoing, it will be appreciated that each of the reservoirs is adapted to communicate with its corresponding battery cell by way of an air conduit and a liquid conduit, the former of which includes the connector tube 31, the flexible tube or pipe 34, the tubular extension 41, and the air tube or quick dumping chamber 45, and the latter of which includes the connector tube 32, the flexible tube or pipe 35, the tubular extension 42, and the liquid tube 47.

By reason of the fact that the lower ends of the connector tubes 31 and 32 are located within the recess 26 of the stoppers 25, it will be appreciated that these tubes are adequately protected against breakage under all ordinary conditions of use. As to the extensions 41 and 42 of the caps 40, such extensions are similarly protected by guard flanges 53 which surround the same, the guard flanges being preferably formed integral with the respective battery caps.

With the reservoirs 10, 11 and 12 mounted as shown and connected to the respective cells by the hereinbefore described liquid and air conduits, the operation of the device is as follows: As the electrolyte level drops below the vent or air intake 51 in any one of the cells, air enters the air tube or quick dumping chamber 45 through that vent or air intake and rises only to its top (normally not entering the small diameter tubular extension 41 or the small diameter flexible tube or pipe 34) with the result that such liquid as may be present in the air tube or quick dumping chamber as a result of the prior battery filling operation is instantaneously freed and permitted to escape through the liquid discharge opening 52. Due to the sudden release of all liquid from the air tube or quick dumping chamber 45, the column of liquid within the air conduit is immediately shortened with respect to the column of liquid within the liquid conduit as measured from the level of the electrolyte within the cell to the level of the water within the reservoir with which such cell communicates. This shortening or unbalance permits the starting of the initial siphon flow as follows: As a result of this quickly established differential, the liquid within the liquid conduit moves downwardly by gravity, creating a partial vacuum in the reservoir corresponding to the cell to be replenished. Due to the partial vacuum, thus created, such liquid as remains in the air conduit following the sudden release of liquid from the air tube or quick dumping chamber 45 by way of the discharge opening 52, i. e. the liquid in the small diameter flexible tube or pipe 34, is lifted by suction into the reservoir. As soon as complete displacement of liquid within the air conduit has been effected, air is drawn into the reservoir, thus stopping the siphon flow. As this air bubbles up through the water, thus destroying the partial vacuum, the water within the reservoir is free to flow into its corresponding cell, thus raising the level of the electrolyte. As the level of the electrolyte moves up past the vent or air intake opening 51, the flow of liquid from the reservoir generates therein a partial vacuum. As the partial vacuum becomes more and more pronounced, the flow of liquid is gradually decreased and at the same time liquid is sucked from the cell into the air tube or dumping chamber 45 and thence into the flexible tube or pipe 34 until such time as an equilibrium is established as between the reservoir and its associated conduits, whereupon the flow of liquid from the reservoir is discontinued. This state of equilibrium is maintained until the vent or air intake opening 51 is again uncovered by the receding electrolyte, whereupon the filling operation is again carried out as described.

There is only a very limited depth of electrolyte available for such an installation on top of the separators and plates of an ordinary storage battery cell, as shown in Fig. 2. It will be apparent that the liquid conduit opening (the lower end of tube 47) and the air conduit openings (openings 51 and 52) are closely spaced vertically so that both can be within this limited depth of electrolyte. The small difference of liquid column height possible in this limited depth will not be sufficient of itself to provide a sufficient unbalance to overcome the static friction of the liquid in the two conduits and thus start the siphon flow.

Also, it is highly desirable to use small diameter tubes or pipes (such as 34 and 35) to connect the reservoir to the battery cap. Obviously it is not possible for air to rise through the liquid or to bubble up through such small diameter pipes, particularly when the reservoir is in a remote position and the pipes have bends along their lengths, as shown in Fig. 1.

It will be apparent that this quick dumping chamber or air tube 45, with its relatively large cross-sectional area sufficiently large to permit bubbles of air to rise through the liquid therein to its top to thus release all of the liquid in this chamber, serves as a very simple automatic (valveless or stationary) means to start the siphon flow. The quick dumping of the liquid from the chamber or air tube 45 supplies the immediate unbalance between the liquid column heights of the two legs of the siphon (i. e. the air conduit and liquid conduit) and thus permits commercially feasible installation and operation of apparatus of this type in a very limited vertical depth of liquid.

What is claimed is:

1. For use with an electric storage battery cell and a reservoir adapted to contain a liquid to be delivered to said cell: a liquid-level-control device comprising a liquid tube adapted to communicate with said reservoir and with said cell below the minimum liquid level of said cell; and an air tube adapted to communicate with said reservoir independently of said liquid tube; said air tube having a liquid discharge opening through which said air tube is adapted to communicate with said cell and being provided at its side with a vent opening through which said air tube is adapted to communicate with said cell above the minimum liquid level thereof; said vent opening being arranged to serve as a breather for said air tube at the beginning of a battery filling operation, whereby the liquid left within said air tube pursuant to a prior battery filling operation is suddenly released by way of said discharge opening; and said air tube being adapted to serve (upon the release of said liquid therefrom) as a breather for said reservoir, whereby liquid is transferred from said reservoir through said liquid tube to said cell until the level of the electrolyte is raised above the level of communication of said cell with said air tube by way of said vent opening.

2. For use with an electric storage battery cell and a reservoir adapted to contain a liquid to be delivered to said cell: a liquid-level-control device comprising a liquid tube adapted to communicate with said reservoir and with said cell below the minimum liquid level of said cell; an air tube adapted to communicate with said reservoir independently of said liquid tube; and a baffle wall associated with the lower end of said air tube and adapted to serve as a guard against the passage of gas bubbles from the electrolyte into said air tube; said air tube having a liquid discharge opening through which said air tube is adapted to communicate with said cell and being provided at its side with a vent opening through which said air tube is adapted to communicate with said cell above the minimum liquid level thereof; said vent opening being arranged to serve as a breather for said air tube at the beginning of a battery filling operation, whereby the liquid left within said air tube pursuant to a prior battery filling operation is suddenly released by way of said discharge opening; and said air tube being adapted to serve (upon the release of said liquid therefrom) as a breather for said reservoir, whereby liquid is transferred from said reservoir through said liquid tube to said cell until the level of the electrolyte is raised above the level of communication of said cell with said air tube by way of said vent opening.

3. For installation and use with a conventional storage battery cell and an individual otherwise sealed higher level liquid reservoir therefor: automatic but motionless electrolyte level maintaining apparatus comprising, in combination, two small diameter pipes, one small diameter pipe being adapted to be connected at its upper end to the lower portion of said reservoir and having means at its lower end forming a small area opening into said cell electrolyte on top of the separators and plates, the other of said small diameter pipes being adapted to be connected at its upper end to said reservoir, an upright quick dumping chamber extending from adjacent the top of said cell down into its electrolyte having its upper portion connected to the lower end of said second small diameter pipe and having in its lower side portion relatively large area opening means for the ready admission of air and quick discharge of liquid into the cell electrolyte at a level adjacent the maximum or standard electrolyte level, said dumping chamber having a sufficiently large lateral cross-sectional area so that on exposure of said large area opening means by a lowering of the electrolyte level air bubbles can readily rise through the liquid therein only to the top of said chamber to quickly release all its liquid whereby there is provided a static unbalance between the liquid in the legs of the siphon system (formed by the above elements) sufficient to start siphon flow down said first pipe and of the liquid in said second pipe followed by air up said second pipe into said reservoir until this air reaches the reservoir when siphon action stops and this air reduces the reservoir's partial vacuum permitting liquid to continue to flow down said first pipe until stopped by the closing of the dumping chamber opening means.

4. For use with a storage battery cell and an individual otherwise sealed liquid reservoir therefor positioned above said cell and remote therefrom: automatic valveless electrolyte level maintaining apparatus comprising, in combination, two long, small diameter, flexible siphon pipes adapted to have bends along their lengths as installed, each pipe at its upper end being adapted to open into said otherwise sealed remote reservoir to form therewith a siphon system, an upright quick dumping chamber having its upper portion connected to the lower end of one of said pipes to form therewith an air conduit and having its lower portion communicating with the cell electrolyte adjacent the standard or maximum level thereof, the other of said pipes being adapted to be connected at its upper end with the lower part of said reservoir and having means at its lower end communicating with said cell adjacent the level of communication of said dumping chamber to form with its liquid pipe a liquid conduit, said quick dumping chamber having an appreciable height sufficient when emptied to provide a siphon flow starting unbalance between the liquid column heights of said conduits and having a lateral cross-sectional area appreciably greater than that of said pipes and large enough so that on lowering of the electrolyte level air can enter said chamber through its exposed communication and rise through the liquid in said chamber to its top to quickly release the liquid therein and thus start the initial siphon action or flow of liquid down said liquid conduit into said cell and of the liquid in said air pipe followed by air up said pipe into said reservoir.

5. A storage battery cell cap adapted to be used with installed automatic filling apparatus for said cell and including an upright quick dumping chamber of a limited but appreciable height adapted to extend adjacent to the top of the battery cell and down into the limited depth of electrolyte on top of the cell separators and plates, said chamber having an otherwise closed upper portion with a small diameter opening and means to connect it to a corresponding small diameter pipe (both chamber and pipe being normally filled with liquid) and liquid discharge and air entry opening means adjacent its bottom below the maximum electrolyte level, and said chamber having a lateral cross-sectional area large enough so that on lowering of the electrolyte below its opening means air can enter and rise through the liquid in said chamber only to its top to quickly release only the liquid therein.

6. A storage battery cell cap adapted to be used with installed automatic filling apparatus for said cell and including an upright unitary housing member of a limited but appreciable height adapted to extend to adjacent the top of said battery cell and down into the limited depth of electrolyte on top of the cell separators and plates, said unitary housing being completely separated by an upright integral common wall into a small cross-sectional area liquid tube and an upright quick dumping chamber of relatively large cross-sectional area large enough for air to rise through liquid therein, said unitary housing having an otherwise closed upper portion for said tube and said chamber with separate small diameter openings and means to connect them to corresponding small diameter tubes for said tube and for said chamber, both of which have opening means in their lower portions into the electrolyte below the maximum level thereof.

7. Automatic but stationary filling and liquid level regulating apparatus to be installed in the top of a vessel in which there is only a very limited portion of the top liquid depth available and to be connected by two separate small diameter siphon pipes to a higher mounted otherwise sealed liquid reservoir; said apparatus comprising means of small cross-sectional area connecting and communicating one of said small diameter pipes with the top of said vessel adjacent or below its maximum liquid level, and an upright quick dumping chamber extending from adjacent the top of said vessel down into its liquid, said chamber having a cross-sectional area large enough to permit air to rise through the liquid therein to its top and means connecting and communicating its otherwise closed upper portion with the other of said small diameter pipes, and opening means in its lower portion communicating with said vessel adjacent its maximum liquid level.

8. For installation in liquid in a vessel having only a limited available depth therefor and for connection with an otherwise sealed liquid reservoir positioned above said vessel; liquid level maintaining apparatus comprising, in combination, two small diameter liquid carrying pipes, one of said pipes adapted to be connected at its upper end to the lower portion of said reservoir and having at its lower end means forming a small area opening into said vessel's limited liquid depth, the other of said pipes being adapted to be connected at its upper end to said reservoir, and automatic quick liquid dumping means connected to the lower end of said second pipe and opening into said vessel's limited liquid depth, said quick dumping means being constructed and arranged to always quickly dump the liquid held therein upon a predetermined lowering of said vessel's liquid level to provide a sufficient static unbalance to initiate siphon flow down said first pipe and of the liquid in said second pipe up into the reservoir.

ASA H. MOSHER.